United States Patent
Miranda et al.

(10) Patent No.: US 8,324,126 B2
(45) Date of Patent: Dec. 4, 2012

(54) PROCESS OF PREPARATION OF CATALYTIC SUPPORT AND SUPPORTED METALLOCENE CATALYSTS FOR PRODUCTION OF HOMOPOLYMERS AND COPOLYMERS OF ETHYLENE WITH ALFA-OLEFINS, OF HIGH AND ULTRA HIGH MOLECULAR WEIGHT AND WITH BROAD MOLECULAR WEIGHT DISTRIBUTION IN SLURRY, BULK AND GAS

(75) Inventors: Marcia Silva Lacerda Miranda, Porto Alegre (BR); Fernanda Oliveira Vieira da Cunha, Porto Alegre (BR)

(73) Assignee: Braskem S.A., Camacari, Bahia (BR)

( * ) Notice: Subject to any disclaimer, the term of this patent is extended or adjusted under 35 U.S.C. 154(b) by 375 days.

(21) Appl. No.: 12/163,711

(22) Filed: Jun. 27, 2008

(65) Prior Publication Data

US 2009/0163682 A1   Jun. 25, 2009

(30) Foreign Application Priority Data

Oct. 19, 2007 (BR) ..................... 0703586

(51) Int. Cl.
- *C08F 4/6592* (2006.01)
- *C08F 4/642* (2006.01)
- *C08F 10/02* (2006.01)
- *B01J 31/22* (2006.01)

(52) U.S. Cl. ........ 502/152; 502/103; 502/115; 502/120; 502/132; 526/124.2; 526/129; 526/160; 526/348; 526/943

(58) Field of Classification Search ........... 502/103, 502/115, 120, 132, 152; 526/124.2, 129, 526/160, 348, 943
See application file for complete search history.

(56) References Cited

U.S. PATENT DOCUMENTS

| | | | |
|---|---|---|---|
| 5,965,477 A * | 10/1999 | Sivaram et al. | ........... 502/107 |
| 2002/0173603 A1 | 11/2002 | Kohler et al. | |
| 2006/0094589 A1 | 5/2006 | Xiao et al. | |
| 2007/0105712 A1 | 5/2007 | Panitzky et al. | |

FOREIGN PATENT DOCUMENTS

| | | |
|---|---|---|
| EP | 0416928 A | 3/1991 |
| EP | 0627448 A | 12/1994 |
| WO | 96/40796 A | 12/1996 |

OTHER PUBLICATIONS

Extended European search report for European Application No. 08290828.6. Feb. 5, 2009.

* cited by examiner

*Primary Examiner* — Caixia Lu
(74) *Attorney, Agent, or Firm* — Duane Morris LLP

(57) ABSTRACT

The present invention relates a process for the preparation of catalytic support and the supported metallocene catalysts used in the production of ethylene homopolymers and ethylene copolymers with α-olefins, of high and ultra high molecular weight with broad molecular weight distribution, in gas or liquid phase polymerization processes, the latter being in slurry, bulk or suspension, and the products obtained from these processes.

3 Claims, No Drawings

(12) United States Patent
US 8,324,126 B2

PROCESS OF PREPARATION OF CATALYTIC SUPPORT AND SUPPORTED METALLOCENE CATALYSTS FOR PRODUCTION OF HOMOPOLYMERS AND COPOLYMERS OF ETHYLENE WITH ALFA-OLEFINS, OF HIGH AND ULTRA HIGH MOLECULAR WEIGHT AND WITH BROAD MOLECULAR WEIGHT DISTRIBUTION IN SLURRY, BULK AND GAS

CROSS REFERENCE RELATED APPLICATIONS

This application claims priority to copending Brazilian Patent Application No. PI 0703586-1 filed Oct. 19, 2007, which is entirely incorporated herein by reference.

FIELD OF THE INVENTION

The present invention relates to supported metallocene catalysts and to a process for the preparation of supported metallocene catalysts based on transition metals of the groups 4 or 5 of the Periodic Table and containing groups of monocyclopentadienyl, monoindenyl or monofluorenyl type, substituted or not, in the absence of activators as aluminoxanes or organoboron base compounds, with application in ethylene homopolymerization and ethylene copolymerization with α-olefins. The invention also relates to the catalytic support and to the ethylene homopolymers and ethylene copolymers with α-olefins, of high and ultra high molecular weight, such as HMWPE and UHMWPE, with broad molecular weight distribution, thus produced. The present catalytic system presented in this patent application can be used in slurry, bulk and gas phase polymerization processes.

BACKGROUND INFORMATION

Metallocene-type complexes are increasingly becoming important as a new generation of catalysts for the preparation of polyolefins. By metallocenes, it is understood transition metal complexes containing one or more π ligands of the cyclopentadienyl type, substituted or not, such as, for example, sandwich- or half-sandwich-type compounds, i.e., metal complexed to two π ligands or one π ligand, respectively. These complexes become active in olefin polymerization when activated by an organometallic compound also known as cocatalyst. Known examples of cocatalysts, widely used in the activation of metallocenes, are aluminoxanes, particularly methylaluminoxane (herein referred as MAO).

Comparatively to the conventional Ziegler-Natta catalytic system, the homogeneous metallocene catalytic systems not only show high catalytic activities, but also the capacity to control the properties of the polyolefins as function of the compounds used in its synthesis and reaction conditions.

A great number of publications related to the preparation of polyolefins with metallocenes are appearing in literature. However, the disadvantage, in most cases, is the fact to be required the use of a large excess of aluminoxanes, in relation to the transition metal content of the catalyst, to yield acceptable productivities. Due to the high cost of the aluminoxane and also to the necessity of extra work of purification of the polymers obtained, the production of poliolefins in industrial scale, based on these catalytic systems, generally becomes anti-economic. Besides, the use of toluene, which is commonly used in the formulation of aluminoxanes solution, particularly the MAO, is increasingly becoming highly undesirable due to toxicological reasons in relation to the field of application of the polyolefins and storage stability reasons of the highly concentrated formulations (tendency to gel formation).

Efforts have been made in the sense to substitute, at least partially, the use of aluminoxanes for lower cost compounds or those having less adverse effects in the productivity, morphology and properties of the polymers. Such efforts are shown in the patents EP-A 287666, EP-A 294942, EP-A 442725, EP-A 553757 and WO 97/11775.

According to Ishihara in his article Macromolecules 21, 3356 (1988), metallocene catalysts with monocyclopentadienyl ligand such as, for example, $CpTiCl_3$, after reacting with MAO, are effective in the polymerization of styrene obtaining high yields of syndiotactic polystyrene. However, Chien had demonstrated in his article, J. Polym. Sci., Polym. Chem. Ed. 28, 15 (1990), that the $CpTiCl_3$-MAO complex has very low activity for ethylene polymerization.

Other known problem of the use of metallocene catalysts are the "poor" morphology of the polymeric material obtained; this results in apparent low bulk density and heterogeneous polymer. Since the replication phenomenon is being applied to polymerization reactions, i.e., the formation of polymer particles with morphology similar to those of catalyst particles, the problem has been resolved only improving the morphology of the catalyst used on those reactions. Methods for producing supported metallocene catalysts are described, for example, in the patents WO 95/07939, WO 87/03889, WO 94/28034, EP 206794 and EP 250600, where derivatives of aluminoxane compounds are used as cocatalysts. In addition to aluminoxane compounds, organoboron based compounds can also be used as activators, and the patents WO 91/09882, WO 94/03506, EP 628574 and WO 95/15815 teach to use them along with metallocene catalysts during the supported catalyst preparation.

The Chinese patent CN 1364817A, in its turn, shows that it is possible to obtain polyethylene from a silica-based supported metallocene catalyst containing monocyclopentadienyl and β-dicetone ligands, magnesium chloride and activated by MAO.

Several catalytic systems have been used to produce polyethylenes presenting an extremely high molecular weight. Such polymers are usually known as ethylene homopolymer or ethylene copolymer with α-olefins, of high and ultra high molecular weights, called henceforth HMWPE and UHMWPE, respectively. The HMWPE shows viscosimetric molecular weight (herein referred as Mv) that may range between 500,000 to 2,500,000 g/mol, while the UHMWPE shows Mv that is above 2,500,000 g/mol, which represents about 10 to 20 times more than the molecular weight of conventional high-density polyethylene (herein referred as HDPE).

The U.S. Pat. No. 5,576,600 teaches how to prepare a UHMWPE with a Ziegler-Natta catalyst and also shows that α-olefins, such as butene-1, which can be incorporated in these polyethylenes.

The commercially produced UHMWPE in moderate pressures and temperatures is traditionally obtained by Ziegler-Natta catalyst, as showed in patents U.S. Pat. No. 5,880,055 and BR 9,203,645A. Another characteristic of these polymers is that they show similar property to the conventional HDPE that is the broad molecular weight distribution (herein referred as MWD), with the MWD value ranging from 5 to 20.

Highly active metallocene catalysts as any single-site type catalyst for HMWPE and UHMWPE synthesis are not very common. For example, the U.S. Pat. No. 5,444,145 teaches how to prepare polyethylene presenting ponderal average molecular weight (herein referred as Mw) until 1,000,000 g/mol and containing incorporated α-olefins, with a homogeneous metallocene catalyst. Such polyethylenes show narrow MWD and a homogeneous distribution of α-olefin in the polyethylene chain. Moreover, the U.S. Pat. No. 6,265,504, in its turn, teaches how to produce a polyethylene with Mw higher than 3,000,000 g/mol and a MWD below 5 with single-site type catalyst, which is an organometallic compound containing a ligand with heteroatom, and activated by non-aluminoxane compounds. Other single-site catalysts containing ligands as pyridine are reported in the U.S. Pat. No. 5,637,660 and are particularly useful to produce UHMWPE with Mw above 3,000,000 g/mol.

Recently, in patent WO 02/079272, the synthesis of a homogeneous metallocene catalyst with bisindenil ligands with double bridge between these ligands which produced a polyethylene with Mw between 500,000 e 10,000,000 g/mol, was reported.

The U.S. Pat. No. 6,265,504 comments that the patent processes include solution, slurry and gas-phase, but the preference is by the process in solution. U.S. Pat. No. 5,444,145, in its turn, comments that the catalyst can be used in polymerization processes using liquid phase for synthesis.

Therefore, references in the state of the art, considered alone or in combination, do not describe nor suggest a process for the preparation of supported metallocene catalysts for the reaction of ethylene homopolymerization and ethylene copolymerization with α-olefins from supported metallocene catalysts based on transition metals of the groups 4 or 5 of the periodic table, containing ligands like monocyclopentadienyl, monoindenyl or monofluorenyl, substituted or not, in the absence of activators such as aluminoxanes or organoboron compounds and that produce ethylene homopolymers and ethylene copolymers with α-olefins, with high molecular weight and ultra high molecular weight, such as HMWPE and UHMWPE, with broad molecular weight distribution, used in gas-phase and bulk polymerization processes in addition to processes in slurry, as described and claimed in this application The obtained ethylene homopolymers and ethylene copolymers with α-olefins show high molecular weight, broad MWD, in the presence of mentioned supported metallocene catalysts based on transition metal of the groups 4 or 5 of the periodic table, containing ligands like monocyclopentadienyl, monoindenyl or monofluorenyl, substituted or not. More specifically, the present invention relates to a process for preparation of supported metallocene catalysts based on transition metal of the groups 4 or 5 of the periodic table, containing ligands like monocyclopentadienyl, monoindenyl or monofluorenyl, substituted or not, for the reaction of ethylene homopolymerization and ethylene copolymerization with α-olefins, from a catalytic support prepared in the absence of activators such as aluminoxanes or organoboron based compounds. More specifically, the present invention also relates to a process to produce ethylene homopolymers or ethylene copolymers with α-olefins, with high molecular weight and ultra high molecular weight, such as HMWPE and UHMWPE, with broad MWD, in the presence of the mentioned supported metallocene catalysts based on transition metal of the groups 4 or 5 of the periodic table, containing ligands like monocyclopentadienyl, monoindenyl or monofluorenyl, substituted or not, in the absence of activators like aluminoxanes or organoboron based compounds. The invention also relates to the catalytic support prepared in the absence of activators such as aluminoxanes or organoboron based compounds, to the supported metallocene catalysts based on transition metal of the groups 4 or 5 of the periodic table, containing ligands like monocyclopentadienyl, monoindenyl or monofluorenyl, substituted or not, to the ethylene homopolymers and ethylene copolymers with α-olefins, with high molecular weight and ultra high molecular weight, such as HMWPE and UHMWPE, and broad MWD, and to the polymerization processes to produce ethylene homopolymers and ethylene copolymers with α-olefins with high molecular weight and ultra high molecular weight in presence of the mentioned supported metallocene catalysts based on transition metal of the groups 4 or 5 of the periodic table, containing ligands like monocyclopentadienyl, monoindenyl or monofluorenyl, substituted or not, and in the absence of activators such as aluminoxanes or organoboron based compounds.

SUMMARY OF THE INVENTION

The present invention relates to a process for the preparation of supported metallocene catalysts based on transition metals of the groups 4 or 5 of the periodic table, containing ligands like monocyclopentadienyl, monoindenyl or monofluorenyl, substituted or not, to the supported metallocene catalysts based on transition metal of the groups 4 or 5 of the periodic table, containing ligands like monocyclopentadienyl, monoindenyl or monofluorenyl, substituted or not, to the application in reactions of ethylene homopolymerization and ethylene copolymerization with α-olefin and to the ethylene homopolymers and ethylene copolymers with α-olefins, with high molecular weight and ultra high molecular weight, such as HMWPE and UHMWPE, and broad MWD, obtained in processes of liquid-phase polymerization, i.e., in slurry, bulk or suspension, or in gas-phase, produced this way.

The process to obtain supported metallocene catalysts based on transition metals of the groups 4 or 5 of the periodic table, containing ligands like monocyclopentadienyl, monoindenyl or monofluorenyl, substituted or not, of the present invention comprises the reaction between (1) catalytic support and (2) reaction product between transition metal complex of the groups 4 or 5 of the periodic table, containing ligands like monocyclopentadienyl, monoindenyl or monofluorenyl, substituted or not, and an activator which is an organometallic compound of the groups 2 or 13 of the Periodic Table and a non-aluminoxane activator.

The process of the present invention of preparation to obtain the catalytic support comprises the following steps:
a) Impregnation of a silica, thermally activated, using a solution of organometallic compound of the groups 2 or 13 of the periodic table, in an inert organic solvent;
b) Preparation of a solution of one or more magnesium-based compounds with a polar solvent;
c) Impregnation of the silica obtained in (a) using the prepared solution in (b);
d) Removal of the polar solvent by vacuum;
e) Reaction of the solid obtained in (d) with a solution of one or more organometallic compounds of the groups 2 or 13 of the periodic table, in an inert organic solvent;

The process of the present invention of preparation to obtain supported metallocene catalysts based on transition metals of the groups 4 or 5 of the Periodic Table containing ligands like monocyclopentadienyl, monoindenyl or monofluorenyl type, substituted or not, comprises the following steps:
f) Reaction of a transition metal complex of the groups 4 or 5 of the periodic table, containing ligands like monocyclopentadienyl, monoindenyl or monofluorenyl, substituted or not, with solution of one or more organometallic compounds of the groups 2 or 13 of the periodic table, in an inert organic solvent;

g) Reaction of the solid obtained in (e) with the solution obtained in (f);

h) Optionally, reaction between the solid obtained in (g) with a halogenating agent;

Thus, the present invention provides a process to obtain a catalytic support based on thermally treated silica with a solution of organometallic compound of the groups 2 or 13 of the Periodic Table and posteriorly with the solution of a magnesium-based compound with a polar solvent.

The present invention also provides a process to obtain a catalytic support where is performed a posterior treatment with a solution of one or more organometallic compounds of the groups 2 or 13 of the periodic table.

The present invention also provides a process for the preparation of supported metallocene catalysts based on transition metals of the groups 4 or 5 of the Periodic Table, containing ligands like monocyclopentadienyl, monoindenyl or monofluorenyl, substituted or not, from the catalytic support.

The present invention provides the supported metallocene catalysts based on transition metals of the groups 4 or 5 of the Periodic Table, containing ligands like monocyclopentadienyl, monoindenyl or monofluorenyl, substituted or not, especially suitable for the production of HMWPE and UHMWPE polymers.

The present invention provides the preparation of ethylene homopolymers and ethylene copolymers with α-olefins, with high molecular weight and ultra high molecular weight, such as HMWPE and UHMWPE.

The present invention also provides the use of the supported metallocene catalysts based on transition metals of the groups 4 or 5 of the Periodic Table, containing ligands like monocyclopentadienyl, monoindenyl or monofluorenyl, substituted or not, in processes of liquid phase (slurry, bulk or suspension) or gas phase polymerization.

The present invention also provides the preparation of ethylene homopolymers and ethylene copolymers with α-olefins, with high molecular weight and ultra high molecular weight, such as HMWPE and UHMWPE in processes of liquid phase (slurry, bulk or suspension) or gas phase polymerization, with the mentioned supported metallocene catalysts based on transition metals of the groups 4 or 5 of the Periodic Table, containing ligands like monocyclopentadienyl, monoindenyl or monofluorenyl, substituted or not.

The present invention also provides the preparation of ethylene homopolymers and ethylene copolymers with α-olefins, with high molecular weight and ultra high molecular weight, such as HMWPE and UHMWPE and broad MWD, in processes of liquid phase (slurry, bulk or suspension) or gas phase polymerization, with the mentioned supported metallocene catalysts based on transition metals of the groups 4 or 5 of the Periodic Table, containing ligands like monocyclopentadienyl, monoindenyl or monofluorenyl, substituted or not, in the absence of activators such as aluminoxanes or organoboron based compounds.

DETAILED DESCRIPTION OF THE PREFERRED MODALITIES

Throughout the present specification, the terms below have the following meaning:

HDPE: high density polyethylene
HMWPE: ethylene homopolymers or ethylene copolymers with α-olefins, with high molecular weight
UHMWPE: ethylene homopolymers or ethylene copolymers with α-olefins, with ultra high molecular weight
LLDPE: linear low density polyethylene
TEAL: triethylaluminum
TMAL: trimethylaluminum
TIBAL: tri-isobutylaluminum
TNHAL: tri-n-hexylaluminum
DMAC: dimethylaluminum chloride
DEAC: diethylaluminum chloride
THF: tetrahydrofuran
Cp: cyclopentadienyl ligand
Ind: indenyl ligand
Flu: fluorenyl ligand
Me: methyl group
nBu: n-butyl group
Ti content: amount, in % wt, of titanium in the supported metallocene catalyst, determined by colorimetric analysis in an ultraviolet spectrometer Cary 100 from Varian.
Hf content: amount, in % wt, of hafnium in the supported metallocene catalyst, determined by X-Ray Fluorescence using a spectrometer from Bruker model S4.
Mg content: percent, in % wt, of magnesium in the catalytic support or supported metallocene catalyst, determined by atomic absorption spectroscopy using a Spectraa 110 spectrometer from Varian.
Al content: amount, in % wt, of aluminum in the catalytic support or supported metallocene catalyst, determined by atomic absorption spectroscopy using a Spectraa 110 spectrometer from Varian.
Cl content: amount, in % wt, of chlorine in the supported metallocene catalyst, determined by titration.
THF content: amount, in % wt, of tetrahydrofuran on catalytic support or supported metallocene catalyst, measured by gas chromatography in a CP 6800 equipment from Varian.
Al/M: molar ratio between aluminum and transition metal of the groups 4 or 5 of the Periodic Table of the supported metallocene catalyst molar ratio.
Al/THF: molar ratio between aluminum and tetrahydrofuran of the catalytic support.
A: catalytic activity of the ethylene homopolymerization and ethylene copolymerization with α-olefins, in Kg PE/g catalyst.
$V_{C4}$=: volume, in mL, of butene-1 added to the reactor for ethylene copolymerization.
$V_{Cn}$=: volume, in mL, of α-olefin added to the reactor for ethylene copolymerization, where n can range from 3 to 12.
$D_{50}$: median particle diameter of the catalytic support or supported metallocene catalysts, determined according to a method based in the principle of optical diffraction of monochromatic laser light, using a Mastersizer 2000 apparatus.
TFP: represents the amount of fines, in % wt, in the polymer by the method for sieving where this content is measured from equation 1, as follows:

$$TFP = MFG \times 100 / MA \qquad \text{Equation 1}$$

where,
MFG=mass of fines retained on a 120 sieve and background;
MA=total mass of the polymer sample;
100=conversion factor.
B.D.: represents polymer bulk density, in $g/cm^3$, measured by the method ASTM D-1895.
TE: represents the flowing time, in seconds (s), of the polymers determined from the method that consists in leaving the sample to flow by gravity effect through a funnel with defined dimensions and measure the total time for flowing.

P.D.: represents density in the molded, in $g/cm^3$, and measured by the method ASTM D-792.

$T_{m2}$: represents the melting temperature, in ° C., of the polymer determined by Differential Scanning Calorimetry performed in equipment Thermal Analysis Instruments DSC-2010.

η: represents polymer intrinsic viscosity, in dL/g, determined by ASTM D-4020.

Mv: represents polymer viscosimetric molecular weight calculated by Margolies equation contained in ASTM D-4020.

MWD: represents the polymer molecular weight distribution (Mw/Mn), determined from GPC curve performed in an equipment Waters GPC 150C equipped with refraction index detector.

$C_n^=$: represents percent in weight (% wt), of α-olefin linked to the polymer chain, determined by $^{13}C$ NMR, where n can range from 3 to 12 and represents the number of carbons present in α-olefin.

As used in this patent, in reference to the Periodic Table of Elements, the new numeration scheme of the Periodic Table is used as in the reference CRC HANDBOOK OF CHEMISTRY AND PHYSICS (David R. Lide ed., CRC Press 81.sup.st ed. 2000).

The invention relates to a process for the preparation of supported metallocene catalysts based on transition metals of the groups 4 or 5 of the Periodic Table, containing ligands like monocyclopentadienyl, monoindenyl or monofluorenyl, substituted or not, in the absence of activators such as aluminoxanes or organoboron based compounds, to the supported metallocene catalysts based on transition metal of the groups 4 or 5 of the Periodic Table, containing ligands like monocyclopentadienyl, monoindenyl or monofluorenyl, substituted or not, to the application in ethylene homopolymerization and ethylene copolymerization reactions with α-olefin in liquid phase (slurry, bulk or suspension) or gas phase processes and to the ethylene homopolymers and ethylene copolymers with α-olefins, with high molecular weight and ultra high molecular weight, such as HMWPE and UHMWPE, and broad MWD, produced this way.

The process to obtain supported metallocene catalysts based on transition metals of the groups 4 or 5 of the Periodic Table, containing ligands like monocyclopentadienyl, monoindenyl or monofluorenyl, substituted or not, of the present invention involves the reaction between (1) catalytic support and (2) the reaction product between the transition metal complex of the groups 4 or 5 of the Periodic Table, containing ligands like monocyclopentadienyl, monoindenyl or monofluorenyl, substituted or not, and a non-aluminoxane activator.

The process of the present invention of preparation of the catalytic support comprised the following steps:

a) Impregnation of a silica, thermally activated, using a solution of organometallic compound of the groups 2 or 13 of the Periodic Table, in an inert organic solvent;

b) Preparation of a solution of one or more magnesium-based compounds with a polar solvent;

c) Impregnation of the silica obtained in (a) using the prepared solution in (b);

d) Removal of the polar solvent by vacuum;

e) Reaction of the solid obtained in (d) with a solution of one or more organometallic compounds of the groups 2 or 13 of the Periodic Table, in an inert organic solvent;

The process of the present invention of preparation to obtain supported metallocene catalysts based on transition metals of the groups 4 or 5 of the Periodic Table containing ligands like monocyclopentadienyl, monoindenyl or monofluorenyl type, substituted or not, comprises the following steps:

f) Reaction of a transition metal complex of the groups 4 or 5 of the Periodic Table, containing ligands like monocyclopentadienyl, monoindenyl or monofluorenyl, substituted or not, with solution of one or more organometallic compounds of the groups 2 or 13 of the periodic table, in an inert organic solvent;

g) Reaction of the solid obtained in (e) with the solution obtained in (f);

h) Optionally, reaction between the solid obtained in (g) with a halogenating agent.

In step (a) of the process for preparation of the catalytic support of the present invention, the preferable support used was silica and this is microspheroidal and presents the following characteristics: median particle diameter ($D_{50}$) between 0.5 and 80 μm, preferably between 1 and 60 μm, a superficial area between 50 and 500 $m^2/g$, preferably between 100 and 300 $m^2/g$, a volume of pores between 1.0 and 2.0 ml/g, preferably between 1.5 and 1.8 ml/g, an average diameter of pores between 10 and 40 nm, preferably between 20 and 30 nm. This silica must undergo a thermal treatment before its use in the preparation of the catalytic support. Such treatment must be performed in inert atmosphere, at a temperature ranging from 100 to 800° C., for a period of 1 to 20 h. After this thermal treatment, the remaining content of OH groups in the silica surface is ranging from 0.1 to 2 mmoles OH per g of silica, preferably between 0.5 and 1.5 mmoles per g of silica.

In the step (a) of the process for preparation of the catalytic support of the present invention, the impregnation of silica is preferably performed suspending the silica, previously thermally treated, in a proportion ranging between 10 and 20 parts per weight for each 100 parts in volume of the solution of organometallic compound of the groups 2 or 13 of the periodic table, in an inert organic solvent, and keeping under stirring at a temperature that may range between the room temperature and boiling temperature of the solution of organometallic compound of the groups 2 or 13 of the periodic table, in inert organic solvent, preferably between 25° C. and 60° C., for a period from 30 to 120 minutes, preferably between 50 and 70 minutes.

The most proper organometallic compounds of the groups 2 or 13 of the Periodic Table to be used in the step a) are aluminum alkyl compounds and aluminum alkyl halocarbons. Specific examples of such compounds are trimethyllluminum (TMAL), triethylaluminum (TEAL), tri-isobutilaluminum (TIBAL), tri-n-hexylaluminum (TNHAL), tri-n-octilaluminum (TNOAL), dimethylaluminum chloride (DMAC), methylaluminum dichloride (MADC), diethylaluminum chloride (DEAC), ethylaluminum dichloride (EADC), di-isobutylaluminum chloride (DIBAC), isobutylaluminum dichloride (MONIBAC). These compounds can be used concentrated or preferably dissolved in an organic solvent of the aliphatic hydrocarbon type.

Aliphatic hydrocarbons used as solvents to prepare the solution of organometallic compound of the groups 2 or 13 of the Periodic Table can present between 4 and 50 carbons, preferably between 6 and 20 carbons. Specific examples of these aliphatic hydrocarbons used as solvents are n-hexane, n-heptane, isopentane, n-octane, isoparaffin and more preferably n-hexane, isopentane and n-heptane.

In the step (a) of the process for preparation of the catalytic support of the present invention, the step of impregnation of the solution of organometallic compound of the groups 2 or 13 of the Periodic Table, in an inert organic solvent, is performed using an amount of organometallic compound in a range from 0.01 to 1 mmol of the metal belonging to the groups 2 or 13 of the Periodic Table per mol of groups OH present in the silica surface, preferably between 0.1 and 0.7 mmol of the metal belonging to the groups 2 or 13 of the Periodic Table per mol of groups OH present in the silica surface.

In the end of the step of impregnation of silica with the solution of organometallic compound of the groups 2 or 13 of the periodic table, in an inert organic solvent, the treated silica can be recovered after removal of liquid present in the step a) by different usual methods such as decantation and siphonation, filtration and vacuum removal. The operation temperature in this step can vary between room temperature and boiling temperature of the aliphatic hydrocarbon used as solvent, preferably at room temperature. The dried silica is used directly in the following step.

According to the present invention, in the step (b) of the process, a liquid compound is obtained from the solubilization of, at least, a magnesium-based compound, selected among magnesium halocarbon, magnesium alkoxy halocarbon, magnesium alkyl halocarbon, magnesium dialkyl and magnesium dialkoxy and a polar solvent. Generally, it is necessary to heat the mixture of these compounds up to a temperature ranging from 25° to 150° C., preferably between 40° and 100° C., for a period from 0.5 to 10 hours, preferably between 1 and 5 hours. The solution containing the mentioned compounds needs to be prepared under turbulent stirring and under inert conditions.

The most proper magnesium-based compound, selected among magnesium halocarbon, magnesium alkoxy halocarbon, magnesium alkyl halocarbon, magnesium dialkyl and magnesium dialkoxy to be used in the step b) are magnesium dichloride ($MgCl_2$), magnesium ethoxy chloride ($Mg(OCH_2CH_3)Cl$), magnesium ethyl chloride ($Mg(CH_2CH_3)Cl$), diethyl magnesium ($Mg(CH_2CH_3)_2$), diethoxy magnesium ($Mg(OCH_2CH_3)_2$). Magnesium dichloride, $MgCl_2$, is preferably used.

The most proper polar solvents for the solubilization of, at least, a magnesium-based compound, selected among magnesium halocarbon, magnesium alkoxy halocarbon, magnesium alkyl halocarbon, magnesium dialkyl and magnesium dialkoxy of the step (b) are selected among ethers, alcohols and ketones. Specific examples of these polar solvents are ethyl ether, tetrahydrofuran, ethyl alcohol and ketone methylethyl, more preferably ethyl alcohol and tetrahydrofuran.

The quantity of magnesium-based compound used in the preparation of the described solution in the step (b) corresponds to a range of 0.002 to 0.2 g of magnesium compound per g of silica.

In the step (c), the silica obtained in step (a) is put in contact with the solution obtained in the step (b). The impregnation that happens in this step is performed suspending 10 to 20 parts per silica weight, obtained in the step (a), for each 100 parts per volume of solution obtained in the step (b). The suspension is kept under stirring at a temperature ranging from room temperature to the boiling temperature of the polar solvent used in the step (b), preferably between 50° C. and 100° C., for a period of 30 to 300 minutes, preferably between 60 and 240 minutes. After this period, the polar solvent used in the solution of the step (b) is removed per vacuum in the step (d). The remaining polar solvent in the solid obtained in (d) after the use of the vacuum must remain between 7 and 15% wt, preferably between 8 and 12% wt.

In the step (e) of the process for preparation of the catalytic support of the present invention, the solid obtained in (d) is suspended in an inert organic solvent such as hexane or heptane, and this is put in contact with one or more organometallic compounds of the groups 2 or 13 of the Periodic Table, in order to remove the content of remaining polar solvent in the solid. The molar ratio between organometallic compound of the groups 2 or 13 of the Periodic Table, and the remaining polar solvent in the solid, range between 0.2 and 2, preferably between 0.3 and 1. The reaction between the organometallic compounds of the groups 2 or 13 of the Periodic Table and the remaining polar solvent in the solid happens under stirring at a temperature that may range between the room temperature and boiling temperature of the solution of organometallic compounds of the groups 2 or 13 of the Periodic Table, in inert organic solvent, preferably between 25° C. and 60° C., for a period of 30 to 300 minutes, preferably between 50 and 120 minutes.

The most proper organometallic compounds of the groups 2 or 13 of the Periodic Table to be used in the step (e) are aluminum alkyl compounds and aluminum alkyl halocarbons. Specific examples of such compounds are trimethylluminum (TMAL), triethylaluminum (TEAL), tri-isobutylaluminum (TIBAL), tri-n-hexylaluminum (TNHAL), tri-n-octilaluminum (TNOAL), dimethylaluminum chloride (DMAC), methylaluminum dichloride (MADC), diethylaluminum chloride (DEAC), ethylaluminum dichloride (EADC), di-isobutylaluminum chloride (DIBAC), isobutylaluminum dichloride (MONIBAC), ethylmagnesium butyl (BEM), octilmagnesium butyl (BOMAG), methylmagnesium chloride and ethylmagnesium chloride. These compounds can be used concentrated or preferably dissolved in an organic solvent of the aliphatic hydrocarbon type.

When using more than one organometallic compound of the groups 2 or 13 of the Periodic Table in the step (e), the different compounds can be fed in the same solution or in separate solutions, at the same time or in subsequent additions.

The catalytic support of the present invention obtained at the end of the step (e) can present in its composition a remaining content of polar solvent that can range between 1 and 8% wt.

In the step (f) of the process for preparation of the supported metallocene catalysts based on transition metals of the groups 4 or 5 of the Periodic Table containing ligands like monocyclopentadienyl, monoindenyl or monofluorenyl type, substituted or not, of the present invention, the transition metal complex of the groups 4 or 5 of the Periodic Table containing ligands like monocyclopentadienyl, monoindenyl or monofluorenyl type, substituted or not, is dissolved in an inert organic solvent of the aliphatic or aromatic hydrocarbon, preferably aliphatic, at a temperature ranging from the room temperature to the boiling temperature of the organic solvent used, preferably between 30° and 150° C.

Transition metal complexes of the groups 4 or 5 of the Periodic Table containing ligands like monocyclopentadienyl, monoindenyl or monofluorenyl type, substituted or not, used for this purpose are composed of the groups 4 or 5 of the periodic table, preferably of the group 4, such as, for example, Ti, Zr and Hf. Such complexes present organic groups of monocyclopentadienyl, monoindenyl or monofluorenyl type, which can be substituted or not, i.e., such groups are mononuclear aromatic rings that are linked to the transition metal by $\pi$ bond. Other ligands can be linked to the transition metal such as, halogens and alkoxy groups, preferably chlorides and methoxy, respectively.

The transition metal complex of the groups 4 or 5 of the Periodic Table containing ligands like monocyclopentadienyl, monoindenyl or monofluorenyl type, substituted or not, used in the present invention is derived from a formula compound

  [L]–MQ$_3$  formula 1 where,

M is a transition metal of the groups 4 or 5;

Q, which can be equal or different, is a halogen radical, aryl radical, alkyl radical containing between 1 and 5 carbon atoms or alkoxy radical containing between 1 and 5 carbon atoms;

L is a bulky ligand of the cyclopentadienyl, indenyl or fluorenyl type, substituted or not by hydrogen, alkyl, cycloalkyl, aryl, alkenyl, alkylaryl, arylalkyl or arylalkenyl, linked to the transition metal by π bond.

According to examples incorporated to the present invention, examples representing, but not limiting, the compounds having the formula I include CpTiCl$_3$, CpZrCl$_3$, CpHfCl$_3$, CpVCl$_3$, CpTi(Me)$_3$, CpZr(Me)$_3$, CpHf(Me)$_3$, CpTi(OMe)$_3$, CpZr(OMe)$_3$, CpHf(OMe)$_3$, CpTi(OEt)$_3$, CpZr(OEt)$_3$, CpHf(OEt)$_3$, IndTiCl$_3$, IndZrCl$_3$, IndHfCl$_3$, IndVCl$_3$, IndTi(Me)$_3$, IndZr(Me)$_3$, IndHf(Me)$_3$, IndTi(Me)$_3$, IndZr(OMe)$_3$, IndHf(OMe)$_3$, IndTi(OEt)$_3$, IndZr(OEt)$_3$, IndHf(OEt)$_3$, FluTiCl$_3$, FluZrCl$_3$, FluHfCl$_3$, FluVCl$_3$, FluTi(Me)$_3$, FluZr(Me)$_3$, FluHf(Me)$_3$, FluTi(OMe)$_3$, FluZr(OMe)$_3$, FluHf(OMe)$_3$, FluTi(OEt)$_3$, FluZr(OEt)$_3$, FluHf(OEt)$_3$, (MeCp)TiCl$_3$, (MeCp)ZrCl$_3$, (MeCp)HfCl$_3$, (MeCp)VCl$_3$, (MeCp)Ti(Me)$_3$, (MeCp)Zr(Me)$_3$, (MeCp)Hf(Me)$_3$, (MeCp)Ti(OMe)$_3$, (MeCp)Zr(OMe)$_3$, (MeCp)Hf(OMe)$_3$, (MeCp)Ti(OEt)$_3$, (MeCp)Zr(OEt)$_3$, (MeCp)Hf(OEt)$_3$, (nBuCp)TiCl$_3$, (nBuCp)ZrCl$_3$, (nBuCp)HfCl$_3$, (nBuCp)VCl$_3$, (nBuCp)Ti(Me)$_3$, (nBuCp)Zr(Me)$_3$, (nBuCp)Hf(Me)$_3$, (nBuCp)Ti(OCH$_3$)$_3$, (nBuCp)Zr(OCH$_3$)$_3$, (nBuCp)Hf(OCH$_3$)$_3$, (nBuCp)Ti(OEt)$_3$, (nBuCp)Zr(OEt)$_3$, (nBuCp)Hf(OEt)$_3$, (Me$_5$Cp)TiCl$_3$, (Me$_5$Cp)ZrCl$_3$, (Me$_5$Cp)HfCl$_3$, (Me$_5$Cp)VCl$_3$, (Me$_5$Cp)Ti(Me)$_3$, (Me$_5$Cp)Zr(Me)$_3$, (Me$_5$Cp)Hf(Me)$_3$, (Me$_5$Cp)Ti(OMe)$_3$, (Me$_5$Cp)Zr(OMe)$_3$, (Me$_5$Cp)Hf(OMe)$_3$, (Me$_5$Cp)Ti(OEt)$_3$, (Me$_5$Cp)Zr(OEt)$_3$, (Me$_5$Cp)Hf(OEt)$_3$, (4,7-Me$_2$Ind)TiCl$_3$, (4,7-Me$_2$Ind)ZrCl$_3$, (4,7-Me$_2$Ind)HfCl$_3$, (4,7-Me$_2$Ind)VCl$_3$, (4,7-Me$_2$Ind)Ti(Me)$_3$, (4,7-Me$_2$Ind)Zr(Me)$_3$, (4,7-Me$_2$Ind)Hf(Me)$_3$, (4,7-Me$_2$Ind)Ti(OMe)$_3$, (4,7-Me$_2$Ind)Zr(OMe)$_3$, (4,7-Me$_2$Ind)Hf(OMe)$_3$, (4,7-Me$_2$Ind)Ti(OEt)$_3$, (4,7-Me$_2$Ind)Zr(OEt)$_3$, (4,7-Me$_2$Ind)Hf(OCH$_2$CH$_3$)$_3$, (2-MeInd)TiCl$_3$, (2-MeInd)ZrCl$_3$, (2-MeInd)HfCl$_3$, (2-MeInd)VCl$_3$, (2-MeInd)Ti(Me)$_3$, (2-MeInd)Zr(Me)$_3$, (2-MeInd)Hf(Me)$_3$, (2-MeInd)Ti(OMe)$_3$, (2-MeInd)Zr(OMe)$_3$, (2-MeInd)Hf(OMe)$_3$, (2-MeInd)Ti(OEt)$_3$, (2-MeInd)Zr(OEt)$_3$, (2-MeInd)Hf(OEt)$_3$, (2-arilInd)TiCl$_3$, (2-arilInd)ZrCl$_3$, (2-arilInd)HfCl$_3$, (2-arilInd)VCl$_3$, (2-arilInd)Ti(Me)$_3$, (2-arilInd)Zr(Me)$_3$, (2-arilInd)Hf(Me)$_3$, (2-arilInd)Ti(OMe)$_3$, (2-arilInd)Zr(OMe)$_3$, (2-arilInd)Hf(OMe)$_3$, (2-arilInd)Ti(OEt)$_3$, (2-arilInd)Zr(OEt)$_3$, (2-arilInd)Hf(OEt)$_3$, (4,5,6,7-H$_4$Ind)TiCl$_3$, (4,5,6,7-H$_4$Ind)ZrCl$_3$, (4,5,6,7-H$_4$Ind)HfCl$_3$, (4,5,6,7-H$_4$Ind)VCl$_3$, (4,5,6,7-H$_4$Ind)Ti(Me)$_3$, (4,5,6,7-H$_4$Ind)Zr(Me)$_3$, (4,5,6,7-H$_4$Ind)Hf(Me)$_3$, (4,5,6,7-H$_4$Ind)Ti(OMe)$_3$, (4,5,6,7-H$_4$Ind)Zr(OMe)$_3$, (4,5,6,7-H$_4$Ind) Hf(OMe)$_3$, (4,5,6,7-H$_4$Ind)Ti(OEt)$_3$, (4,5,6,7-H$_4$Ind)Zr(OEt)$_3$, (4,5,6,7-H$_4$Ind)Hf(OEt)$_3$, (9-MeFlu)TiCl$_3$, (9-MeFlu)ZrCl$_3$, (9-MeFlu)HfCl$_3$, (9-MeFlu)VCl$_3$, (9-MeFlu)Ti(Me)$_3$, (9-MeFlu)Zr(Me)$_3$, (9-MeFlu)Hf(Me)$_3$, (9-MeFlu)Ti(OMe)$_3$, (9-MeFlu)Zr(OMe)$_3$, (9-MeFlu)Hf(OMe)$_3$, (9-MeFlu)Ti(OEt)$_3$, (9-MeFlu)Zr(OEt)$_3$, (9-MeFlu)Hf(OEt)$_3$.

The most proper organic solvents of the aliphatic hydrocarbon type to suspend or solubilize the transition metal complex of the groups 4 or 5 of the Periodic Table containing ligands like monocyclopentadienyl, monoindenyl or monofluorenyl type, substituted or not, are n-hexane, n-heptane, isopentane, n-octane, isoparaffin and more preferably are n-hexane, isopentane and n-heptane.

The quantity of transition metal complex of the groups 4 or 5 of the Periodic Table containing ligands like monocyclopentadienyl, monoindenyl or monofluorenyl type, substituted or not, used in the preparation of the solution corresponding to a range from 0.002 to 0.2 g of transition metal complex of the groups 4 or 5 of the Periodic Table per g of silica.

The quantity of organometallic compound of the groups 2 or 13 of the Periodic Table, relative to the transition metal, corresponds to a molar ratio that varies between 0.5 and 5, preferably between 1 and 4.

In the step (g), the solid product obtained in (e) is reacted with the product in solution obtained in the step (f) at a temperature ranging from the room temperature to the boiling temperature of the organic solvent used, preferably between 30° and 150° C., for a period from 30 to 300 minutes, preferably between 50 and 120 minutes.

Optionally, in the step (h), the solid obtained in (g) is put in contact with a halogenating agent. Useful halogenating agents for the practice of the present invention are preferably pure or diluted liquids in an inert organic solvent. Examples representing, but not limiting, the halogenating agents include dimethylaluminum chloride (DMAC), methylaluminum dichloride (MADC), diethylaluminum chloride (DEAC), ethylaluminum dichloride (EADC), di-isobutylaluminum chloride (DIBAC), isobutylaluminum dichloride (MONIBAC), aluminum ethyl sesquichloride (EASC), silicon tetrachloride (SiCl$_4$), tetrachloride tin (SnCl$_4$), trichlorosilan methyl (MeSiCl$_3$), dimethyl dichlorosilan (Me$_2$SiCl$_2$), titanium tetrachloride (TiCl$_4$), vanadium tetrachloride (VCl$_4$), carbon tetrachloride (CCl$_4$), t-butyl chloride, chloroform and dichloromethane.

The preferred halogenating agents are chlorination agents and among them, aluminum ethyl sesquichloride (EASC), silicon tetrachloride (SiCl$_4$), tin tetrachloride (SnCl$_4$), chloroform and dichloromethane are preferred, more preferably the silicon tetrachloride (SiCl$_4$).

The quantity of halogenating agent used optionally in the step (h) of the process, relative to the transition metal, corresponds to a molar ratio between 0.5 and 5, preferably between 1 and 3.

The required time for the halogenation of the transition metal complexes of the groups 4 or 5 of the Periodic Table containing groups of the monocyclopentadienyl, monoindenyl or monofluorenyl type, substituted or not, and containing alkoxy radicals ranges between 0.5 and 5 h, preferably between 1 and 3 h. The required temperature for the halogenation of the transition metal complexes of the groups 4 or 5 of the Periodic Table containing groups of the monocyclopentadienyl, monoindenyl or monofluorenyl type, substituted or not, and containing alkoxy radicals ranges between the room temperature and the boiling temperature of the inert organic solvent used, preferably between 30° and 100° C.

The solid product obtained in (g) or (h) is rinsed with an inert organic solvent, preferably hexane, and then dried. The washing temperature can vary between the room temperature and the boiling temperature of the inert organic solvent used, preferably between 30° and 150° C., for a period of 30 to 300 minutes, preferably between 50 and 120 minutes.

The particle size distribution of the supported metallocene catalysts based on the present invention is quite similar to the particle size distribution of the silica used as support and, as a consequence, its D$_{50}$ ranges between 0.5 and 80 μm.

The supported metallocene catalysts of the present invention are proper to be used in process of ethylene homopolymerization and ethylene copolymerization with α-olefins in liquid or gas phases. More specifically, the supported metallocene catalysts of the present invention are proper to be used in processes in bulk, slurry and gas.

The cocatalyst used in the process of ethylene homopolymerization and ethylene copolymerization with α-olefins, using the supported complex of the present invention, is an aluminum alkyl, preferably TMAL, TEAL or TIBAL. The molar ratio Al/M in the process of ethylene homopolymerization and ethylene copolymerization with α-olefins ranges from 30:1 to 500:1.

An important aspect of the supported complex of the present invention is its ability to produce, when submitted to the conditions of ethylene homopolymerization and ethylene copolymerization with α-olefins of high molecular weight (HMWPE) and ethylene homopolymers and ethylene copolymers with α-olefins of ultra-high molecular weight (UHMWPE), with controlled morphology, i.e., spherical, presenting high bulk density (B.D.), i.e., ranging from 0.33 and 0.47 g/cm$^3$ and low TFP, i.e., between 0 and 0.4% wt and good flow, i.e., TE ranging from 6 and 12 seconds. This way, the supported metallocene catalysts can be fed directly to the polymerization reactor. Particular forms to feed the supported metallocene catalysts to the polymerization reactor are powder, paste, in oil suspension or in suspension with solvent.

The supported metallocene catalysts of the present invention are used with advantage in the ethylene homopolymerization and ethylene copolymerization with olefins such as, propene, butene-1, hexene-1,4-methyl-pentene-1, octene-1 and dodecene-1. In particular, these supported metallocene catalysts are used in the preparation of ethylene homopolymers and copolymers with α-olefins of high molecular weight (HMWPE) and of ethylene homopolymers and ethylene copolymers with α-olefins of ultra-high molecular weight (UHMWPE), with broad molecular weight distribution, i.e., MWD ranging from 2 to 15, preferably ranging from 3.7 to 8.

Ethylene homopolymers and copolymers with α-olefins of high molecular weight (HMWPE) and ethylene homopolymers and ethylene copolymers with α-olefins of ultra-high molecular weight (UHMWPE), with broad molecular weight distribution, of the present invention show η ranging from 2 to 30 dL/g. More specifically, the ethylene homopolymers and copolymers with α-olefins of high molecular weight (HMWPE) and the ethylene homopolymers and ethylene copolymers with α-olefins of ultra-high molecular weight (UHMWPE), with broad molecular weight distribution, present η ranging from 4 to 28 dL/g.

The ethylene homopolymers and copolymers with α-olefins of high molecular weight (HMWPE) and the ethylene homopolymers and ethylene copolymers with α-olefins of ultra-high molecular weight (UHMWPE), with broad molecular weight distribution, of the present invention present Mv ranging from 200,000 to 10,000,000 g/mol. More specifically, the ethylene homopolymers and copolymers with α-olefins of high molecular weight (HMWPE) and the ethylene homopolymers and ethylene copolymers with α-olefins of ultra-high molecular weight (UHMWPE), with broad molecular weight distribution, present Mv ranging from 500,000 to 9,000,000 g/mol.

The ethylene homopolymers and copolymers with α-olefins of high molecular weight (HMWPE) and the ethylene homopolymers and ethylene copolymers with α-olefins of ultra-high molecular weight (UHMWPE), with broad molecular weight distribution, of the present invention present P.D. ranging from 0.940 to 0.900 g/cm$^3$.

EXAMPLES

In the examples of the present invention, which must not be considered limiting, used transition metal complexes of the group 4 of the periodic table, such as, for example, CpTiCl$_3$ and IndTiCl$_3$ and organometallic compounds of the group 13 of the periodic table, such as TEAL, TMAL, TIBAL e DEAC, acquired from Akzo Nobel. The magnesium-based compound selected among magnesium halocarbons, was MgCl$_2$, acquired from Maruyasu Co. All reagents mentioned above were used as received. Tetrahydrofuran (THF) was acquired from Tedia Brazil and purified with metallic sodium for water removal and with nitrogen, for oxygen removal. Silica XPO-2402, Dehydrated 25 micron Support and SYLOPOL 5550 were acquired from GRACE DAVISON and used as received.

In the examples related below, the organic solvent used, n-hexane, was acquired from Phillips Petroleum and purified with molecular sieve 3A and nitrogen, to remove water and oxygen, respectively. The organometallic compounds TEAL, TMAL, TIBAL, DMAC e DEAC, were used in solution of n-hexane in a concentration ranging from 10 to 13% wt, depending on the organometallic compound used. All operations were performed using inert atmosphere of nitrogen with upper limit of 1.5 ppm of moisture.

Example 1 a) Preparation of the Catalytic Support

In a 5 L reactor equipped with mechanical stirring and previously purged with nitrogen, was added 44.5 g (0.462 mol) of MgCl$_2$ and 2.5 L of dried THF. This mixture was heated until 60° C. and stirred at 100 rpm for 5 h for complete solubilization of the MgCl$_2$. The obtained solution was, after this period, cooled down to 35° C. In this solution, 300 g of silica XPO-2402 were added, previously dehydrated at 600° C. and treated with 22.3 ml (0.163 mol) of diluted TEAL in n-hexane for 50 minutes at temperature of 25° C. Once finished the addition of silica, the mixture was heated up to 60° C. and stirred at 100 rpm for 1 h. After this period, we stop the stirring and start the THF evaporation through vacuum until the THF content to be incorporated in the support to reach a range between 8 and 12% wt.

The catalytic support obtained was characterized, presenting the following characteristics:
  THF content: 11.2% wt
  Mg content: 2.3% wt
  Al content: 1.2% wt b) Preparation of Supported Metallocene Catalyst In 1-L reactor equipped with mechanical stirring and previously purged with nitrogen, 32 g of the catalytic support prepared in the step (a) and 0.5 L of n-hexane were added. In this suspension, stirred at 200 rpm and the temperature of 25° C., it was slowly added 5.6 mL (45 mol) of diluted DEAC diluted in n-hexane (Al/THF=0.45). The suspension was stirred for 2 h and after this period, the solvent was removed by siphonation. The catalytic support obtained, after this treatment, was characterized presenting the following characteristics:
  THF content: 7.2% wt In a schlenk, equipped with magnetic stirrer and dipped in a heat oil bath, 3.2 g (0.015 mol) of CpTiCl$_3$ and 70 mL of n-hexane were transferred. In this suspension heated up to 50° C. and under stirring, 7.32 mL (0.03 mol) of diluted TIBAL in n-hexane (Al/Ti=2) was slowly added. The dark solution obtained was stirred for 2.5 h at 50° C.

In the catalytic support obtained after the treatment with DEAC, 0.5 L of n-hexane was again added and the suspension was heated up to 50° C. In this suspension stirred at 100 rpm, the dark solution of CpTiCl$_3$/TIBAL was slowly added and, after the addition was ended, the suspension was stirred at 100 rpm at 50° C. for 2 h. Elapsed this period, the temperature was reduced to 30° C. The solid obtained was filtered and dried under fluidization with nitrogen.

The Supported metallocene catalyst obtained was characterized, presenting the following characteristics:
THF content: 3.8% wt
Ti content: 2.6% wt
Mg content: 2.1% wt
Al content: 2.8% wt
Cl content: 10.7% wt
D$_{50}$: 60 µm Example 2 b) Preparation of Supported Metallocene Catalyst

In a 200-mL reactor equipped with mechanical stirring and previously purged with nitrogen, 6.1 g of the catalytic support prepared in the step a) of the EXAMPLE 1 and 50 mL of n-hexane were added. In this suspension, stirred at 200 rpm and under temperature of 25° C., it was slowly added 0.4 mL (4.1 mmol) of diluted TMAL in n-hexane (Al/THF=0.45). The suspension was stirred for 2 h and, after this period, the solvent was removed by siphonation. The catalytic support obtained, after this treatment, was characterized presenting the following characteristics:
THF content: 3.3% wt In a schlenk, equipped with magnetic stirrer and dipped in a heat oil bath, 0.61 g (2.8 mmol) of the CpTiCl$_3$ and 70 mL of n-hexane were transferred. In this suspension heated up to 50° C. and under stirring, 1.4 mL (5.5 mmol) of diluted TIBAL in n-hexane (Al/Ti=2) was slowly added. The dark solution obtained was stirred for 2.5 h at 50° C.

In the catalytic support obtained after the treatment with TMAL, 50 mL of n-hexane was again added and the suspension was heated up to 50° C. In this suspension stirred at 100 rpm, the dark solution of CpTiCl$_3$/TIBAL was slowly added and, after the addition was ended, the suspension was stirred at 100 rpm at 50° C. for 2 h. Elapsed this period, the temperature was elevated to 30° C. The solid obtained was filtered and dried under fluidization with nitrogen.

The Supported metallocene catalyst obtained was characterized, presenting the following characteristics:
THF content: 1.3% wt
Ti content: 1.7% wt
Mg content: 1.9% wt
Al content: 7.3% wt
Cl content: 9.2% wt
D$_{50}$: 60 µm Example 3 b) Preparation of Supported Metallocene Catalyst

In a 200-mL reactor equipped with mechanical stirring and previously purged with nitrogen, 6.1 g of the catalytic support prepared in the step a) of the EXAMPLE 1 and 50 mL of n-hexane were added. In this suspension, stirred at 200 rpm and the temperature of 25° C., it was slowly added 1.44 mL (4.2 mmol) of diluted TNHAL in n-hexane (Al/THF=0.45). The suspension was stirred for 2 h and after this period, the solvent was removed by siphonation. The catalytic support obtained, after this treatment, was characterized presenting the following characteristics:
THF content: 3.4% wt In a schlenk, equipped with magnetic stirrer and dipped in a heat oil bath, 0.61 g (2.8 mmol) of the CpTiCl$_3$ and 70 mL of n-hexane were transferred. In this suspension heated up to 50° C. and under stirring, 1.4 mL (5.5 mmol) of diluted TIBAL in n-hexane (Al/Ti=2) was slowly added. The dark solution obtained was stirred for 2.5 h at 50° C.

In the catalytic support obtained after the treatment with TNHAL, 50 mL of n-hexane were again added and the suspension was heated up to 50° C. In this suspension stirred at 100 rpm, the dark solution of CpTiCl$_3$/TIBAL was slowly added and, after the addition was ended, the suspension was stirred at 100 rpm at 50° C. for 2 h. Elapsed this period, the temperature was elevated to 30° C. The solid obtained was filtered and dried under fluidization with nitrogen.

The Supported metallocene catalyst obtained was characterized, presenting the following characteristics:
THF content: 1.6% wt
Ti content: 1.8% wt
Mg content: 2.1% wt
Al content: 5.3% wt
Cl content: 8.8% wt
D$_{50}$: 58 µm Example 4 b) Preparation of Supported Metallocene Catalyst

In a 200-mL reactor equipped with mechanical stirring and previously purged with nitrogen, 6.1 g of the catalytic support prepared in the step a) of the EXAMPLE 1 and 50 mL of n-hexane were added. In this suspension, stirred at 200 rpm and the temperature of 25° C., it was slowly added 3.15 mL (9.2 mmol) of diluted TNHAL in n-hexane (Al/THF=1). The suspension was stirred for 2 h and after this period, the solvent was removed by siphonation. The catalytic support obtained, after this treatment, was characterized presenting the following characteristics:
THF content: 2.0% p/p In a schlenk, equipped with magnetic stirrer and dipped in a heat oil bath, 0.61 g (2.8 mmol) of the CpTiCl$_3$ and 70 mL of n-hexane were transferred. In this suspension heated up to 50° C. and under stirring, 1.4 mL (5.5 mmol) of diluted TIBAL in n-hexane (Al/Ti=2) was slowly added. The dark solution obtained was stirred for 2.5 h at 50° C.

In the catalytic support obtained after the treatment with TNHAL, 50 mL of n-hexane were again added and the suspension was heated up to 50° C. On this suspension stirred at 100 rpm, the dark solution of CpTiCl$_3$/TIBAL was slowly added and, after the addition was ended, the suspension was stirred at 100 rpm at 50° C. for 2 h. Elapsed this period, the temperature was elevated to 30° C. The solid obtained was filtered and dried under fluidization with nitrogen.

The Supported metallocene catalyst obtained was characterized, presenting the following characteristics:
THF content: 1.0% wt
Ti content: 2.8% wt
Mg content: 1.9% wt
Al content: 9.3% wt
Cl content: 10.2% wt
D$_{50}$: 60 µm Example 5 b) Preparation of Supported Metallocene Catalyst

In a 200-mL reactor equipped with mechanical stirring and previously purged with nitrogen, 6.5 g of the catalytic support prepared in the step a) of the EXAMPLE 1 and 50 mL of n-hexane were added. In this suspension, stirred at 200 rpm and the temperature of 25° C., it was slowly added 0.6 mL (4.8 mmol) of diluted DEAC in n-hexane (Al/THF=1). The suspension was stirred for 2 h and after this period, the solvent was removed by siphonation. The catalytic support obtained, after this treatment, was characterized presenting the following characteristics:

THF content: 3.9% wt

In a schlenk, equipped with magnetic stirrer and dipped in a heat oil bath, 0.65 g (2.4 mmol) of the $IndTiCl_3$ and 70 mL of n-hexane were transferred. In this suspension heated up to 50° C. and under stirring, 1.2 mL (4.7 mmol) of diluted TIBAL in n-hexane (Al/Ti=2) was slowly added. The dark solution obtained was stirred for 2.5 h at 50° C.

In the catalytic support obtained after the treatment with DEAC, 50 mL of n-hexane were again added and the suspension was heated up to 50° C. On this suspension stirred at 100 rpm, the dark solution of $IndTiCl_3$/TIBAL was slowly added and, after the addition was ended, the suspension was stirred at 100 rpm at 50° C. for 2 h. Elapsed this period, the temperature was elevated to 30° C. The solid obtained was filtered and dried under fluidization with nitrogen.

The Supported metallocene catalyst obtained was characterized, presenting the following characteristics:

THF Content: 3.4% wt
Ti Content: 1.1% wt
Mg Content: 2.1% wt
Al Content: 3.1% wt
Cl Content: 9.3% wt
$D_{50}$: 60 μm Example 6 b) Preparation of Supported Metallocene Catalyst

In a schlenk, equipped with magnetic stirrer and dipped in a heat oil bath, 0.65 g (3 mmol) of the $CpTiCl_3$ and 70 mL of n-hexane were transferred. In this suspension heated up to 50° C. and under stirring, 1.5 mL (5.9 mmol) of diluted TIBAL in n-hexane (Al/Ti=2) was slowly added. The dark solution obtained was stirred for 2.5 h at 50° C.

In a 200-mL reactor equipped with mechanical stirring and previously purged with nitrogen, 6.9 g of the silica Sylopol 5550 and 50 mL of n-hexane were added. In this suspension, stirred at 100 rpm, it was slowly added the dark solution of $CpTiCl_3$/TIBAL and, after ending the addition, the suspension was stirred at 100 rpm at 50° C. for 2 h. Elapsed this period, the temperature was reduced by 30° C. The solid obtained was filtered and dried under nitrogen fluidization.

The Supported metallocene catalyst obtained was characterized, presenting the following characteristics:

Ti Content: 1.6% wt
Mg Content: 3.7% wt
Al Content: 1.9% wt
Cl Content: 13.1% wt
$D_{50}$: 53 μm Example 7 b)) Preparation of Supported Metallocene Catalyst

In a 200-mL reactor equipped with mechanical stirring and previously purged with nitrogen, 6.5 g of the catalytic support prepared in the step a) of the EXAMPLE 1 and 50 mL of n-hexane were added. In this suspension, stirred at 200 rpm and the temperature of 25° C., it was slowly added 3.4 mL (9.9 mmol) of diluted TNHAL in n-hexane (Al/THF=1). The suspension was stirred for 2 h and after this period, the solvent was removed by siphonation. The catalytic support obtained, after this treatment, was characterized presenting the following characteristics:

THF Content: 2.9% wt

In a schlenk, equipped with magnetic stirrer and dipped in a heat oil bath, 0.63 g (2.2 mmol) of the $(Me_5 Cp)TiCl_3$ and 70 mL of n-hexane were transferred. In this suspension heated up to 50° C. and under stirring, 1.1 mL (4.3 mmol) of diluted TIBAL in n-hexane (Al/Ti=2) was slowly added. The dark solution obtained was stirred for 2.5 h at 50° C.

In the catalytic support obtained after the treatment with TNHAL, 50 mL of n-hexane was again added and the suspension was heated up to 50° C. On this suspension stirred at 100 rpm, the dark solution of $(Me_5 Cp)TiCl_3$/TIBAL was slowly added and, after the addition was ended, the suspension was stirred at 100 rpm at 50° C. for 2 h. Elapsed this period, the temperature was elevated to 30° C. The solid obtained was filtered and dried under fluidization with nitrogen.

The Supported metallocene catalyst obtained was characterized, presenting the following characteristics:

THF Content: 1.4% wt
Ti Content: 0.7% wt
Mg Content: 2.3% wt
Al Content: 4.4% wt
Cl Content: 8.5% wt
$D_{50}$: 58 μm Homopolymerization with Ethylene In a 4-liter stainless steel reactor from Autoclave Engineer's Inc., it was performed, initially, a purge with $N_2$ for 1 hour at a temperature of 70° C. and, then, the reactor was cooled down to 30° C. After that, a suspension was transferred, in n-hexane, formed by the supported complex and TMAL (Al/Ti=300) followed by 280 g of anhydrous propane. After that, the temperature was increased up to 60° C. again, and the remaining 520 g of anhydrous propane were added. Then, the temperature was again elevated to 75° C. and, then, the reactor was fed with 7 bar of ethylene. The homopolymerization of ethylene was conducted in slurry for a period of 2 h, during which time the pressure of ethylene was steady. After this period, the reactor was cooled down to the room temperature, depressurized and open for polymer removal, with the resin being dried in stove (60° C.) during one hour. The results of catalytic activity (A) and bulk density (B.D.) are presented in the Table 1 below. In Table 2, in its turn, the results of the polyethylene resins, such as η, Mv, polymer density (P.D.) and MWD, are presented.

TABLE 1

| Polymerization | Supported Metallocene Catalyst EXAMPLE | A (kg pol/g cat) | B.D. (g/cm³) | TFP (% wt) | TE (s) |
|---|---|---|---|---|---|
| 1 | 1 | 0.60 | 0.40 | 0.2 | 9.0 |
| 2 | 2 | 0.50 | 0.37 | 0.1 | 9.5 |
| 3 | 3 | 1.10 | 0.34 | 0.3 | 11.0 |
| 4 | 4 | 1.40 | 0.34 | 0.2 | 11.5 |
| 5 | 5 | 2.30 | 0.37 | 0.1 | 9.6 |
| 6 | 6 | 0.16 | n.a. | n.a. | n.a. |
| 7 [a] | 1 | 0.60 | 0.40 | 0 | 8.5 |
| 8 [b] | 1 | 0.30 | n.a. | n.a. | n.a. |
| 9 | 7 | 2.60 | 0.35 | 0.4 | 11.0 |

[a] It was used TIBAL as cocatalyst in the place of TMAL;
[b] It was used DEAC as cocatalyst in the place of TMAL;
n.a.: not analyzed

TABLE 2

| Polymerization | Supported Metallocene Catalyst EXAMPLE | η (dL/g) | Mv (g/mol) | P.D. (g/cm³) | MWD |
|---|---|---|---|---|---|
| 1 | 1 | 15.3 | 3,160,000 | 0.934 | 5.1 |
| 2 | 2 | 7.0 | 990,950 | 0.930 | n.a. |
| 3 | 3 | 13.5 | 2,634,497 | 0.928 | n.a. |
| 4 | 4 | 12.7 | 2,422,947 | 0.929 | n.a. |
| 5 | 5 | 21.4 | 5,229,000 | 0.928 | 6.1 |
| 6 | 6 | 14.9 | 3,050,500 | n.a. | n.a. |
| 7 [a] | 1 | 19.6 | 4,594,990 | 0.930 | n.a. |
| 8 [b] | 1 | 21.2 | 5,172,651 | n.a. | n.a. |
| 9 | 7 | 15.2 | 3,142,800 | n.a. | n.a. |

Copolymerization of Ethylene with Butene-1

In a 4-liter stainless steel reactor from Autoclave Engineer's Inc., it was performed, initially, a purge with $N_2$ for 1 hour at a temperature of 70° C. and, then, the reactor was cooled down until 30° C. After that, a suspension was transferred, in n-hexane, formed by the supported complex and TMAL (Al/Ti=300) followed by 280 g of anhydrous propane. The temperature was increased to 60° C., and after the addition of liquid butane-1 (different volumes), the remaining 520 g of anhydrous propane were added. Then, the temperature was increased again to 75° C. and, then, the reactor was fed with 7 bar of ethylene. The copolymerization of ethylene with butene-1 was conducted in slurry for a period of 2 h, during which time the pressure of ethylene was kept constantly. After this period, the reactor was cooled down to the room temperature, depressurized and open for polymer removal, with the resin being dried in stove (60° C.) during one hour. The results of catalytic activity (A), bulk density (B.D.), content of fines in polymers (TFP) and flow time (TE) are presented in the Table 3 below. In Table 4, in its turn, the results of the polyethylene resins, such as η, Mv, polymer density (P.D.), content of butene-1 ($C_4^=$), melting temperature ($T_{m2}$) and MWD are presented.

TABLE 3

| Polymerization | Supported Metallocene Catalyst EXAMPLE | $V_{C4=}$ (mL) | A (kg pol/g cat) | B.D. (g/cm³) | TFP (% wt) | TE (s) |
|---|---|---|---|---|---|---|
| 10 | 1 | 100 | 1.60 | 0.34 | 0.1 | 10.2 |
| 11 | 1 | 600 | 2.50 | 0.34 | 0.1 | 9.8 |
| 12 | 5 | 600 | 2.73 | 0.33 | 0.1 | 9.5 |
| 13 | 6 | 300 | 1.30 | 0.36 | 0.2 | 10.0 |

TABLE 4

| Polymerization | Supported Metallocene Catalyst EXAMPLE | η (dL/g) | Mv (g/mol) | P.D. (g/cm³) | $C_4^-$ (% wt) | $T_{m2}$ (° C.) | MWD |
|---|---|---|---|---|---|---|---|
| 10 | 1 | 11.0 | 1,943,107 | 0.923 | 2.6 | n.a. | 4.8 |
| 11 | 1 | 7.3 | 1,065,726 | 0.912 | 5.0 | 124 | 5.6 |
| 12 | 5 | 10.0 | 1,712,000 | 0.910 | 7.2 | n.a. | 5.3 |
| 13 | 6 | 10.2 | 1,700,000 | 0.911 | 2.0 | n.a. | n.a. | n.a.: not analyzed

Copolymerization of Ethylene with Different α-Olefins

In a 4-liter stainless steel reactor from Autoclave Engineer's Inc., it was performed, initially, a purge with $N_2$ for 1 hour at a temperature of 70° C. and, then, the reactor was cooled down until 30° C. After that, a suspension was transferred, in n-hexane, formed by the supported complex and TMAL (Al/Ti=300) followed by 280 g of anhydrous propane. The temperature was increased until 60° C., and after the addition of α-olefin (different α-olefins) liquid (different volumes), the remaining 520 g of anhydrous propane were added. Then, the temperature was increased again until 75° C. and, then, the reactor was fed with 7 bar of ethylene. The copolymerization of ethylene with different α-olefins was conducted in slurry for a period of 2 h, during which time the pressure of ethylene was kept constantly. After this period, the reactor was cooled down until room temperature, depressurized and open for polymer removal, with the resin being dried in stove (60° C.) during one hour. The results of catalytic activity (A) and bulk density (B.D.) are presented in the Table 5 below. In Table 6, however, the results of the polyethylene resins, such as η, Mv, polymer density (P.D.), content of α-olefin ($C_n^=$), melting temperature ($T_{m2}$) and MWD, are presented.

TABLE A 5

| Polymerization | Supported Complex EXAMPLE | α-olefin | $V_{Cn=}$ (mL) | A (kg pol/g cat) | B.D. (g/cm³) |
|---|---|---|---|---|---|
| 14 | 1 | Propene | 300 | 0.41 | 0.38 |
| 15 | 1 | Hexene-1 | 300 | 1.35 | 0.37 |
| 16 | 1 | 4-MP-1 | 300 | 0.23 | 0.39 |
| 17 | 5 | Hexene-1 | 300 | 2.20 | 0.35 |

4-MP-1 = 4-mehyl-pentene-1

TABLE A 6

| Polymerization | Supported Complex EXAMPLE | η (dL/g) | Mv (g/mol) | P.D. (g/cm³) | $C_n^=$ (% wt) | $T_{m2}$ (° C.) | MWD |
|---|---|---|---|---|---|---|---|
| 14 | 1 | 4.4 | 471,000 | n.a. | 17.1 | 111.6 | 6.1 |
| 15 | 1 | 5.5 | 697,420 | 0.918 | n.a. | n.a. | 3.6 |
| 16 | 1 | 9.0 | 1,446,473 | n.a. | n.a. | n.a. | 2.7 |
| 17 | 5 | 11.1 | 2,000,000 | 0.917 | 6.5 | n.a. | n.a. |
| Comparative Example [1] | Supported metallocene | n.a. | 250,000 [2] | 0.919 [3] | 9.0 | n.a. | 2.0 | n.a.: not analyzed
[1] Commercial product data
[2] Value calculated by GPC (Mw)
[3] Analysis method: ASTM D-1928-C It must be clear to all those acquiring knowledge about this technique that the present invention can be set of other specific forms without getting far from the spirit or scope of the invention. Particularly, it must comprise that the invention can be set in the described forms.

Therefore, the present examples and configurations must be considered as illustrative and not restrictive, and the invention must not be limited to the details supplied in this document, but can be modified within the scope and equivalent of the attached claims.

The invention claimed is:

1. A supported metallocene catalyst composition for ethylene copolymers with alpha-olefins of ultra high molecular weight, wherein said catalyst composition comprises:

a catalytic support prepared by contacting a silica, an organometallic compound of the groups 2 or 13 of the periodic table, a magnesium compound, and a polar solvent; and a reaction product between a transition metal complex of groups 4 or 5 of the periodic table containing substituted monocyclopentadienyl, monoindenyl, or monofluorenyl ligands and an aluminum compound with structure as $AlR_3$, wherein R can be methyl, ethyl, n-propyl, isobutyl, n-hexyl, n-octyl, and chloride.

2. The supported metallocene catalyst composition according to claim 1, wherein said catalyst composition is configured for use in liquid and gas phase polymerization.

3. The supported metallocene catalyst composition according to claim 2, wherein, when said catalyst composition is configured for use in liquid phase polymerization, the liquid phase is a slurry, a bulk liquid, or a suspension.

* * * * *